US011784601B2

(12) United States Patent
Kim et al.

(10) Patent No.: US 11,784,601 B2
(45) Date of Patent: Oct. 10, 2023

(54) APPARATUS FOR CONTROLLING MOTOR AND METHOD FOR CONTROLLING MOTOR

(71) Applicant: LG ELECTRONICS INC., Seoul (KR)

(72) Inventors: Kwang Sik Kim, Seoul (KR); Ha Min Song, Seoul (KR); Ki Wook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 17/547,719

(22) Filed: Dec. 10, 2021

(65) Prior Publication Data

US 2022/0190769 A1    Jun. 16, 2022

(30) Foreign Application Priority Data

Dec. 14, 2020  (KR) .......................... 10-2020-0174183

(51) Int. Cl.
*H02P 27/06*  (2006.01)
*H02P 21/18*  (2016.01)

(52) U.S. Cl.
CPC ............ *H02P 27/06* (2013.01); *H02P 21/18* (2016.02)

(58) Field of Classification Search
CPC ................................ H02P 27/06; H02P 21/18
See application file for complete search history.

(56) References Cited

U.S. PATENT DOCUMENTS

| | | | |
|---|---|---|---|
| 9,420,279 B2 | 8/2016 | Jang et al. | |
| 2009/0039813 A1* | 2/2009 | Yamada ................. | H02P 29/68 318/434 |
| 2014/0300309 A1* | 10/2014 | Yoo ........................ | H02P 21/18 318/801 |
| 2018/0287526 A1* | 10/2018 | Iwaji ....................... | H02P 6/21 |
| 2020/0195181 A1* | 6/2020 | Yoshikawa ........ | G03G 15/5008 |
| 2021/0351728 A1* | 11/2021 | Pollock ............... | G01R 15/181 |

FOREIGN PATENT DOCUMENTS

KR  10-2013-0135659  12/2013

* cited by examiner

*Primary Examiner* — Zoheb S Imtiaz
(74) *Attorney, Agent, or Firm* — KED & ASSOCIATES, LLP (57) ABSTRACT

Disclosed is a motor control apparatus, a motor control system, and a motor control method that estimate a stator resistance and a rotor position for sensorless control of a motor.

18 Claims, 7 Drawing Sheets

APPARATUS FOR CONTROLLING MOTOR AND METHOD FOR CONTROLLING MOTOR

CROSS-REFERENCE TO RELATED APPLICATIONS

This application claims the benefit of Korean Patent Application No. 10-2020-0174183, filed in Korea on Dec. 14, 2020, in the Korean Intellectual Property Office, the disclosure of which is incorporated herein in its entirety by reference.

BACKGROUND

1. Field

The present disclosure relates to a motor control method and a motor control apparatus for estimating a stator resistance and a rotor position of a motor for a sensorless control of the motor.

2. Background

According to an operation principle for motors used in home appliances, current may be controlled only when exact positions of rotors are identified. In order to obtain position information, encoders, resolvers, hall sensors, and the like may be used, but such position detection devices are generally expensive, and have complicating wirings and structures such that usage environment thereof is limited. Accordingly, in recent years, sensorless control that does not use position detection devices has been actively studied, but the sensorless control has a problem of initial position detection. When an initial position of a motor (rotor) is not correct, a starting torque becomes smaller and a rotation direction of the motor may reverse, which may cause a danger.

Meanwhile, in the related art sensorless control of a motor of a washing machine, an initial position alignment may be carried out to stabilize initial starting characteristics and detection performance. This means that a specific current is applied to the stator of the motor so that the position of the rotor of the motor is aligned. Korean Patent Application No. 10-2013-0135659 discloses a method of performing initial position alignment.

However, when the initial position alignment of a rotor of a motor is performed as in the related art described above, each time starting the motor, a time for aligning the position is required, and as the inertia of an object to be driven by the motor increases, the time taken to align the position becomes even longer. Thus, a net acting ratio of a washing machine may be lowered.

Accordingly, research on a technique for controlling a motor to start after estimating resistance and an initial position instead of performing initial position alignment while performing sensorless control of the motor of a washing machine is in progress.

BRIEF DESCRIPTION OF THE DRAWINGS

Arrangements and embodiments may be described in detail with reference to the following drawings in which like reference numerals refer to like elements and wherein.

DETAILED DESCRIPTION

Hereinafter, example embodiments of the present disclosure will be described in detail with reference to the attached drawings to allow those skilled in the art to easily execute the same. The present disclosure may, however, be implemented in many different forms and should not be construed as being limited to the example embodiments described herein. In addition, parts irrelevant to the description will be omitted in the drawings in order to clearly explain the present disclosure. Similar parts are denoted by similar reference numerals throughout the specification.

Throughout the specification, when one part is referred to as being "connected" to another part, the reference includes the part being "directly connected" to the other part and the part being "indirectly connected" to the other part via an intervening member. Further, when a part is referred to as "including" a component, this means that the part may include another component, and does not exclude another component unless specifically stated otherwise.

Figure 1:
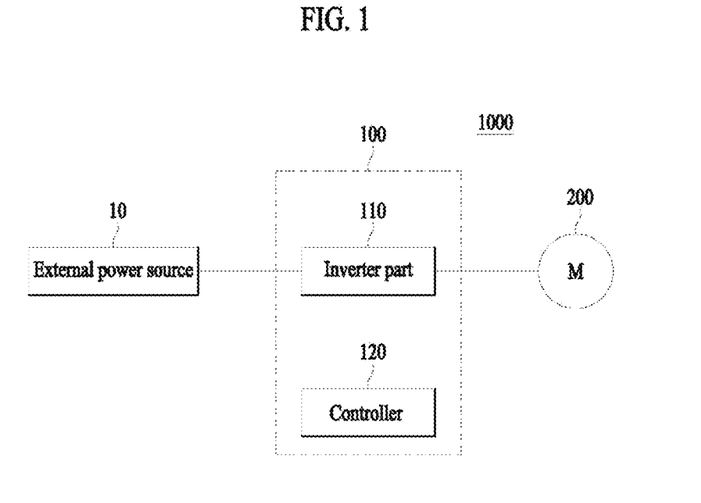
FIG. 1 is a diagram illustrating a configuration of a motor control system including a motor control apparatus according to the present disclosure.

FIG. 1 is a diagram illustrating a configuration of a motor control system including a motor control apparatus according to the present disclosure.

A control apparatus 100 of FIG. 1 is an apparatus for controlling the driving of a motor 200 in a motor control system 1000 configured to control the motor 200.

The motor 200 whose operation is controlled by the control apparatus 100 refers to a three-phase motor having a stator and a rotor, and alternating current (AC) power of a predetermined frequency is applied to a coil of the stator of each phase of three phases so that the rotor rotates.

For example, the motor may be one of a surface-mounted permanent magnet synchronous motor (SMPMSM), an interior permanent magnet synchronous motor (IPMSM), and a synchronous reluctance motor (Synrm).

The motor control apparatus 100 may be an apparatus for controlling the driving of the motor 200 by supplying driving power to the motor 200. In addition, the control apparatus 100 may be an apparatus for controlling the operation of the motor 200 to control the driving of a compressor including the motor 200.

The control apparatus 100 may be an apparatus for controlling the motor 200 using an inverter method. That is, the control apparatus 100 may be an inverter for controlling the driving of the motor 200, or an apparatus including the inverter.

The control apparatus 100 may control the operation of the motor 200 by controlling the inverter in relation to the driving of the motor 200.

Meanwhile, the control apparatus 100 may be an apparatus for controlling the operation of the motor 200 using a sensorless method.

As shown in FIG. 1, the control apparatus 100 includes an inverter part 110 configured to convert direct current (DC) power into AC power and output the AC power to the motor 200, and a controller 120 configured to control the inverter part 110 in relation to the driving of the motor 200.

In the control apparatus 100 including the inverter part 110 and the controller 120, the controller 120 controls the inverter part 110 to apply an input voltage of a specific pattern to the motor 200 in response to a start-up of the driving of the motor 200.

In addition, the controller 120 controls the driving of the motor 200 based on resistance of the stator of motor 200, which is estimated on the basis of a response current corresponding to the input voltage, and a position of the rotor of the motor 200, which is estimated based on a maximum point of the response current.

Here, a maximum magnitude of the response current may be 3 [A] or less, and a frequency of the response current may be 50 Hz or less.

Further, the controller 120 may control the inverter part 110 so that an input voltage of a specific pattern is applied to the motor 200 when the driving of the motor 200 is driving corresponding to a first mode, and an input voltage of a pattern different from that of the specific pattern is applied to the motor 200 when the driving of the motor 200 is driving corresponding to a second mode.

Here, the input voltage of the specific pattern may include a first section in which a voltage is applied and a second section in which the voltage is not applied during a first threshold time such that the response current is reduced to zero after the first section.

Further, while the input voltage of the specific pattern is applied, there may be at least three second sections.

Meanwhile, average torque according to the input voltage of the specific pattern may correspond to zero.

Further, the specific pattern may be at least one of a square wave, a half wave, a pulse, and a sine wave.

Meanwhile, the input voltage of the specific pattern may include a plurality of sub-pattern signals, and an angle of a composite magnetic flux of the motor 200 may be sequentially changed according to the sub-pattern signals.

Here, the number of the sub-pattern signals included in the specific pattern may be inversely proportional to the number of the changed angles of the composite magnetic flux.

Further, the controller 120 may control the driving of the motor 200 on the basis of the angle of the composite magnetic flux corresponding to the sub-pattern signal having the greatest magnitude of the response current according to the input voltage among the plurality of sub-pattern signals.

That is, when the motor 200 starts operating, the control apparatus 100 may estimate the resistance of the stator and the position of the rotor without aligning the position of the rotor of the motor 200, and control the driving of the motor 200.

As such, since the position of the rotor is not aligned before the motor 200 starts operating, a time taken to align the position of the rotor may be reduced.

Figure 2A:
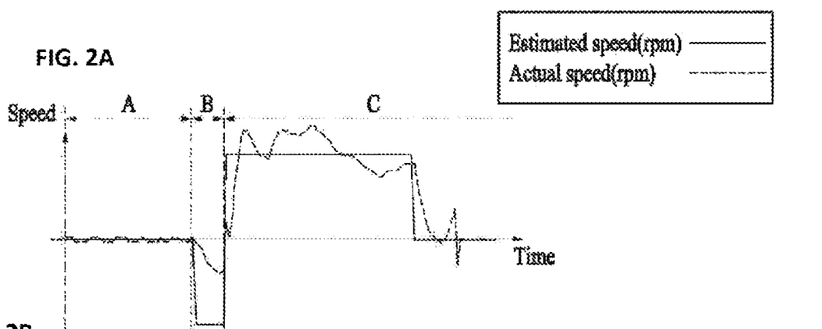
FIGS. 2A and 2B are diagrams illustrating an example of a current applied in response to a start-up of driving of a motor in the related art.
Figure 2B:
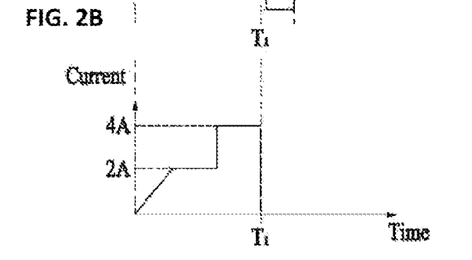

FIGS. 2A and 2B are diagrams illustrating an example of a current applied in response to a start-up of driving of a motor in the related art.

In the related art sensorless control of a motor of a washing machine, an initial position alignment may be carried out to stabilize initial starting characteristics and detection performance. In the initial position alignment operation, as shown in FIGS. 2A and 2B, a DC current is applied to align a position of the motor to a specific position, and then the motor is driven, and by using voltage and current information at this time, a stator resistance Rs, which is an essential parameter for sensorless control, is detected.

Referring to FIGS. 2A and 2B, section A may be a section in which the position alignment of the rotor is carried out, and section B may be a section in which a swing start-up of the motor is carried out. In addition, the starting of the motor may begin from section C. Referring to FIG. 2A, it can be seen that, in section A, a motor speed is close to zero because it is before starting the motor, but when it reaches section C after passing section B, the motor speed increases.

Meanwhile, the current applied to the motor control apparatus in section A may be the same as that shown in FIG. 2B. Conventionally, the resistance of the stator was simultaneously estimated while aligning the position of the rotor. However, there is a problem in that a time (0 to $T_1$) taken to align the position is relatively long, and the greater the inertia of an object to be driven by the motor, the longer the time taken to align the position.

Figure 3A:
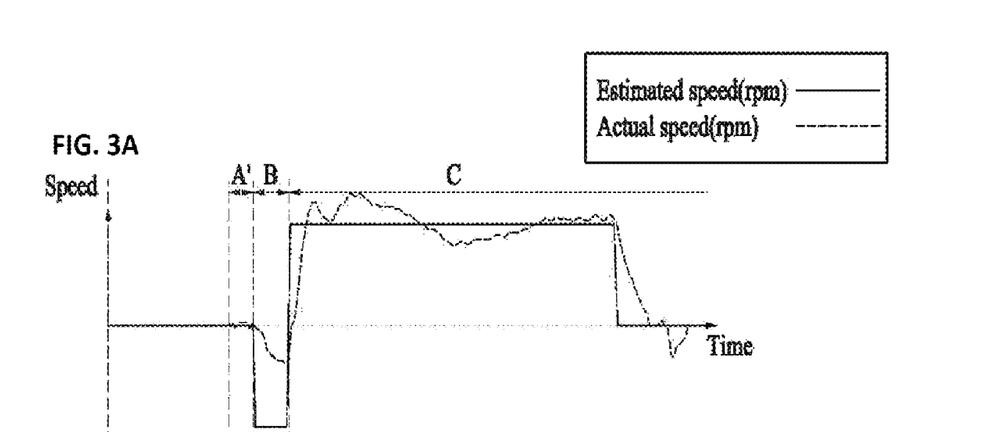
FIGS. 3A and 3B are diagrams illustrating an example of a current applied in response to a start-up of driving of a motor according to the present disclosure.
Figure 3B:
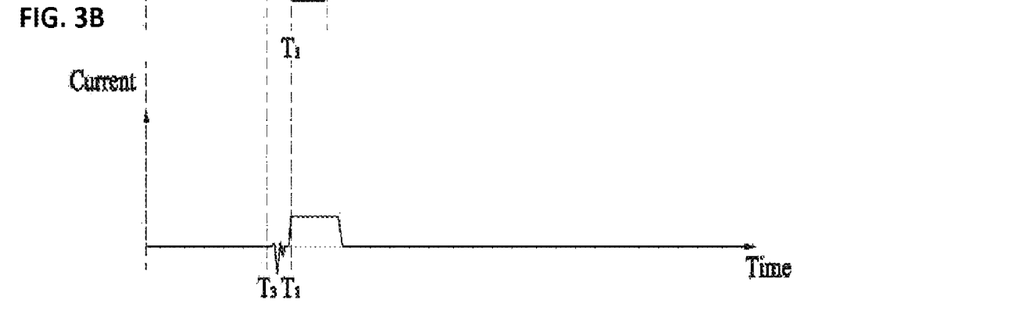

FIGS. 3A and 3B are diagrams illustrating an example of a current applied in response to a start-up of driving of a motor according to the present disclosure.

The motor control apparatus and system according to an example embodiment of the present disclosure may estimate the resistance of the stator and estimate the position of the rotor instead of performing a process of aligning the position of the rotor. Thus, the motor control apparatus may estimate the resistance of the stator and the position of the rotor in section A' shown in FIG. 3A instead of section A shown in FIG. 2A.

At this time, the current applied to the motor control apparatus and system from section A' to section C may be the same as that shown in FIG. 3B. Referring to FIGS. 2A through 3B, it can be seen that a time (section A') taken to estimate the resistance of the stator and the position of the rotor is shorter than a time (section A) taken to align the position of the rotor.

Figure 4:
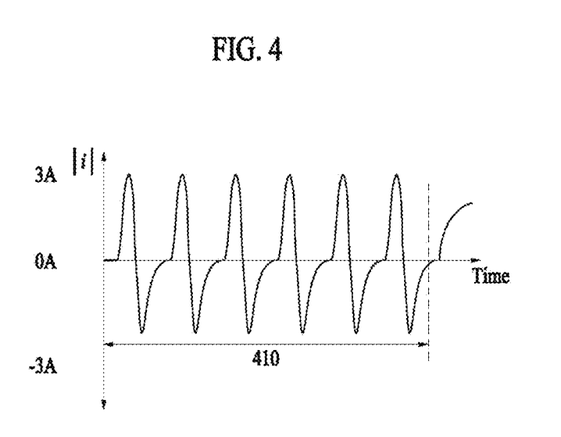
FIG. 4 is a diagram illustrating an example of a response current according to an example embodiment of the present disclosure.

FIG. 4 is a diagram illustrating an example of a response current according to an example embodiment of the present disclosure.

The controller according to an example embodiment may control the inverter part such that an input voltage of a specific pattern is applied to the motor in response to a start-up of the driving of the motor.

Here, the input voltage of the specific pattern may include one of a square wave, a half wave, a pulse, and a sine wave. In addition, the input voltage of the specific pattern may include a plurality of sub-pattern signals, and each of the sub-pattern signals may be applied to different positions of the motor. Accordingly, an angle of a composite magnetic flux of the motor may be sequentially changed according to the sub-pattern signals.

For example, in the case of FIG. 4, a total of six sine wave signals, each of which has one cycle and to each of which an input voltage of a specific pattern is applied, are included in a section 410. Here, each sine wave of one cycle may be defined as the sub-pattern signal, and an input voltage in the section 410, to which the input voltage is applied, may be defined as the input voltage of the specific pattern.

In addition, according to each sub-pattern signal, the angle of the composite magnetic flux of the motor may be changed in the order of 180°, 300°, 120°, 240°, 60°, and 0°, but the order of changes in the angle of the composite magnetic flux of the motor is not limited thereto.

Meanwhile, FIG. 4 is a diagram made on the assumption that a shape of the specific pattern is a sine wave. When the specific pattern has a sine wave shape, torque is generated in a positive direction and a negative direction, so that average torque of one cycle may become zero. Accordingly, torque ripple may be reduced.

Meanwhile, the input voltage may include a plurality of signals, and each of the signals may be applied after a current due to a previously applied signal becomes zero.

Referring to FIG. 4, in the section 410 in which the input voltage is applied, the sine wave of one cycle may be applied six times, and accordingly, the response current may also have a shape similar to the sine wave.

However, each of the sine waves may be a sine wave applied after a first threshold time has passed after a current due to the previously applied voltage becomes zero. That is, since the input voltage is not a continuous sine wave, the response current may also have a shape different from that of the continuous sine wave.

In addition, the number of signals applied to estimate the position may be inversely proportional to an interval between positions to which signals are applied in the motor. In other words, the number of the sub-pattern signals included in the specific pattern may be inversely proportional to the number of changed angles of the composite magnetic flux.

For example, when the number of the signals applied to estimate the position is six, an interval at which the signals are applied in the motor or the changed angle of the composite magnetic flux may be at least 60°, and when the number of the signals applied to estimate the position is 12, an interval at which the signals are applied in the motor or the changed angle of the composite magnetic flux may be at least 30°. That is, in the motor according to an example embodiment, the interval of the positions to which the signals are applied or the changed angle of the composite magnetic flux may be a value obtained by dividing 360° by the number of the signals applied to estimate the position.

Meanwhile, the applied signal may have a low noise frequency and magnitude. For example, the voltage may be applied such that a response current of 3 [A] or less and 50 [Hz] is generated. However, the magnitude and frequency of the voltage that may be applied are not limited thereto, and it is obvious to those skilled in the art that the magnitude and frequency of the voltage may be changed according to system design requirements.

Meanwhile, after starting the motor, current distribution may occur. Accordingly, the controller according to an example embodiment may not perform the resistance estimation and the position estimation according to the present disclosure in a section using current information.

Further, the controller according to an example embodiment may control the inverter part such that the input voltage of the specific pattern is applied to the motor when the driving of the motor is driving corresponding to the first mode, and the input voltage of a pattern different from the specific pattern is applied to the motor when the driving of the motor is driving corresponding to the second mode.

Figure 5:
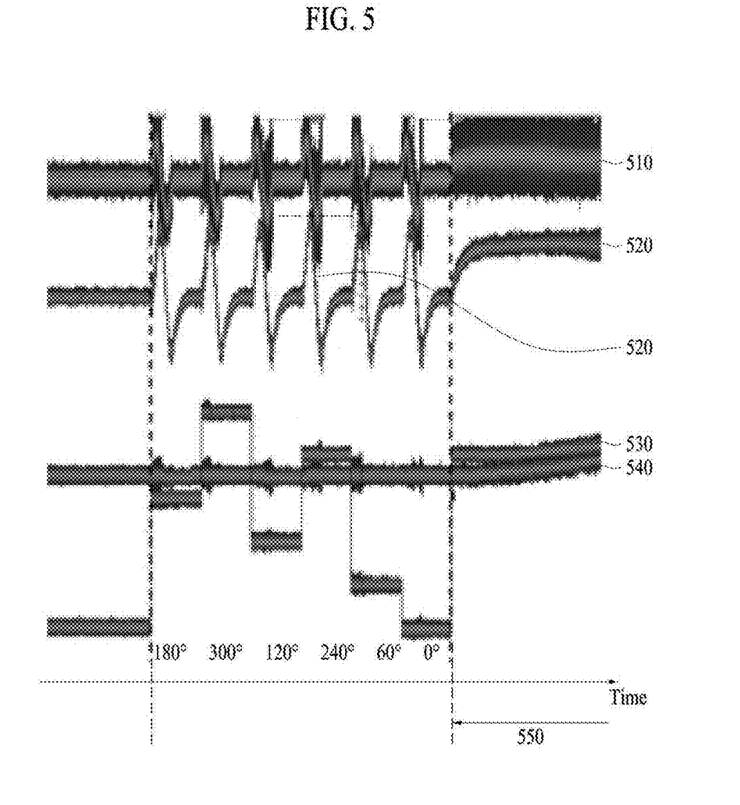
FIG. 5 is a diagram illustrating a signal applied or detected in an input voltage applying section according to an example embodiment of the present disclosure.

FIG. 5 is a diagram illustrating a signal applied or detected in an input voltage applying section according to an example embodiment of the present disclosure.

Referring to FIG. 5, before a start section 550 of the motor, an input voltage 510 of a specific pattern is applied, and a response current 520 for the input voltage 510 may be detected. At this time, a sine wave signal included in the input voltage 510 of the specific pattern may not be continuous, and may have a form in which a signal of a next cycle is applied after a predetermined lengths of time has passed since a response current according to a previously applied signal became zero.

In this case, the controller may estimate a resistance $R_s$ of the stator on the basis of an input voltage $V_{ak}$ and a response current $I_{ak}$, and Equation 1 below.

$$R_s = \frac{\sum_{k=1}^{6}\left(\int V_{ak}\right) - \sum_{k=1}^{6}(L_s I_{ak})}{\sum_{k=1}^{6}\left(\int I_{ak}\right)} \quad \text{[Equation 1]}$$

Here, $L_S$ denotes a stator inductance. In FIG. 5, since six signals are included in the input voltage, the maximum value of k may be six.

Meanwhile, in FIG. 5, an angle 530 of the composite magnetic flux of the motor and a signal 540 related to an actual motor position are illustrated together. Referring to the angle 530 of the composite magnetic flux of the motor of FIG. 5, it can be seen that the angle of the composite magnetic flux changes in the order of 180°, 300°, 120°, 240°, 60°, and 0°.

Here, the controller of the present disclosure may estimate an initial position of the motor using a magnetic flux saturation phenomenon of the motor. Specifically, the controller may estimate the initial position of the motor on the basis of the angle of the composite magnetic flux of the motor corresponding to the maximum point of the response current 520.

Referring to FIG. 5, in the response current 520, the signal having the maximum value is a signal 521 of a fourth cycle, and the angle of the composite magnetic flux of the motor corresponding to the fourth cycle signal 521 is 240°, so that the controller may estimate that the initial position of the motor is 240°. Meanwhile, since the initial position of the motor is 220°, it can be seen that the accuracy of the initial position estimation of the controller of the present disclosure is relatively high.

Figure 6:
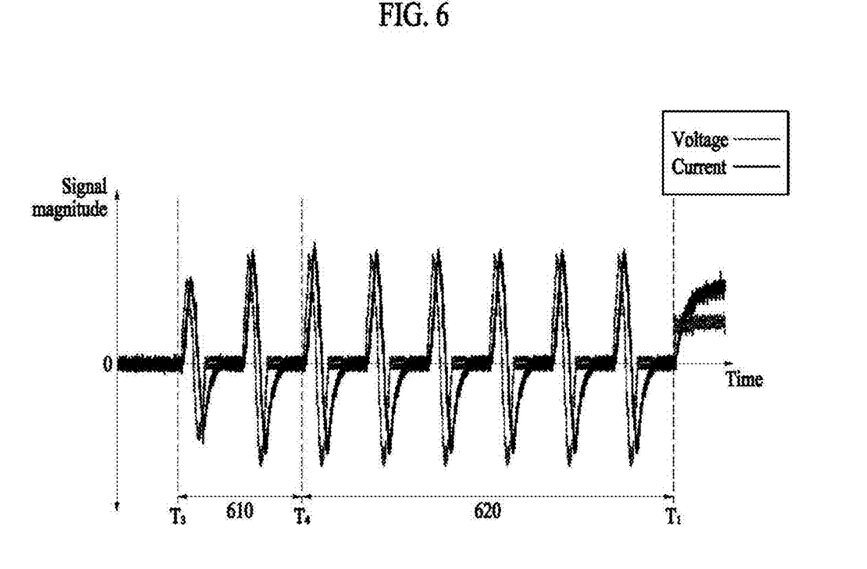
FIG. 6 is a diagram illustrating an example of an input voltage of a specific pattern according to an example embodiment of the present disclosure.

FIG. 6 is a diagram illustrating an example of an input voltage of a specific pattern according to an example embodiment of the present disclosure.

Referring to FIG. 6, the input voltage of the specific pattern according to an example embodiment of the present disclosure may include a first input voltage for estimating resistance and a second input voltage for estimating an initial position. Here, the section in which the first input voltage is applied may be a resistance estimation section 610, and the section in which the second input voltage is applied may be an initial position estimation section 620.

In this case, a signal for estimating the resistance of the stator and a signal for estimating the position of the rotor are separated, and the signal for estimating the resistance is applied prior to the signal for estimating the position, so that the accuracy of the resistance estimation may be improved. That is, since the resistance of the stator is estimated before estimating the position of the rotor, an influence due to the signal for estimating the position may be minimized.

Figure 7:
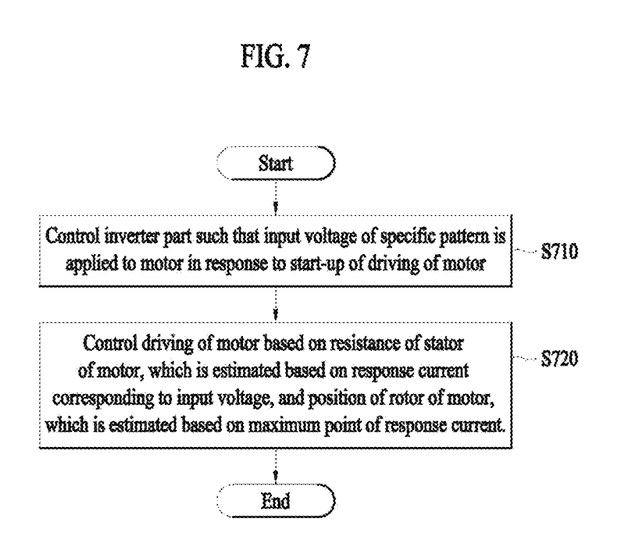
FIG. 7 is a flowchart illustrating a motor control method according to an example embodiment of the present disclosure.

FIG. 7 is a flowchart illustrating a motor control method according to an example embodiment of the present disclosure.

In operation S710, the present disclosure may control the inverter part such that an input voltage of a specific pattern is applied to the motor in response to a start-up of the driving of the motor.

Meanwhile, operation S710 may include controlling the inverter part such that the input voltage of the specific pattern is applied to the motor when the driving of the motor is driving corresponding to the first mode, and the input voltage of a pattern different from the specific pattern is applied to the motor when the driving of the motor is driving corresponding to the second mode.

In operation S720, the present disclosure may control the driving of the motor on the basis of resistance of the stator of the motor, which is estimated on the basis of a response current corresponding to the input voltage, and a position of the rotor of the motor, which is estimated on the basis of the maximum point of the response current.

Here, the input voltage may include a first section in which a voltage is applied and a second section in which the voltage is not applied during a first threshold time such that the response current is reduced to zero after the first section.

Here, a maximum magnitude of the response current may be 3 [A] or less, and a frequency of the response current may be 50 Hz or less.

Further, the input voltage of the specific pattern may include a first section in which a voltage is applied and a second section in which the voltage is not applied during a first threshold time such that the response current is reduced to zero, after the first section.

Further, while the input voltage of the specific pattern is applied, there may be at least three second sections.

Meanwhile, average torque according to the input voltage of the specific pattern may correspond to zero.

Meanwhile, the specific pattern may be at least one of a square wave, a half wave, a pulse, and a sine wave.

Further, the input voltage of the specific pattern may include a plurality of sub-pattern signals, and an angle of a composite magnetic flux of the motor may be sequentially changed according to the sub-pattern signals.

Here, the number of the sub-pattern signals included in the specific pattern may be inversely proportional to the number of the changed angles of the composite magnetic flux.

Further, operation S720 may include controlling the driving of the motor on the basis of the angle of the composite magnetic flux corresponding to the sub-pattern signal having the greatest magnitude of the response current according to the input voltage among the plurality of sub-pattern signals.

The above-described example embodiments of the motor control apparatus and the motor control method according to the present disclosure may be applied to and implemented on a motor control apparatus provided in a motor, for example, an inverter apparatus for controlling the motor, a motor including the same, a control method for the motor, or the like. In particular, the example embodiments may be effectively applied to and implemented on a control apparatus, a control system, and a control method for controlling an initial operation of a motor, a control apparatus a control system, and a control method for aligning a position of a motor, a control apparatus, a control system, a control method for detecting a position of a motor, or the like. In addition, the example embodiments may also be effectively applied to and implemented on a compressor control apparatus provided in a compressor including a motor, for example, an inverter apparatus for controlling a motor of a compressor, a compressor including the same, a control method for the compressor, or the like. However, techniques disclosed herein are not limited thereto, and may also be applied to and implemented on all motor control apparatuses, motor control systems and motor control methods, home appliances including the motor, control apparatuses for home appliances including the motor, and control systems and control methods for home appliances including the motor to which the technical concept of the present disclosure is applicable.

Further, in the present specification, the terms "er (or)" etc. may be a hardware component, such as a processor or circuit, and/or a software component executed by the hardware configuration, such as a processor.

An aspect provides a motor control apparatus, a motor control system, and a motor control method for estimating resistance of a stator and a position of a rotor before starting a motor. The technical goals to be achieved by the present example embodiments is not limited to the above-described technical aspects, and other technical aspects which are not described may be inferred from the following example embodiments.

According to an aspect, there is provided a motor control apparatus including an inverter part configured to convert direct current (DC) power into alternating current (AC) power and output the AC power to a motor, and a controller configured to control the inverter part in relation to driving of the motor, and the controller may control the inverter part such that an input voltage of a specific pattern is applied to the motor in response to a start-up of the driving of the motor, and control the driving of the motor on the basis of resistance of a stator of the motor, which is estimated on the basis of a response current corresponding to the input voltage, and a position of a rotor of the motor, which is estimated on the basis of a maximum point of the response current.

According to another aspect, there is also provided a motor control method of a motor control apparatus including an inverter part configured to convert direct current (DC) power into alternating current (AC) power and output the AC power to a motor and a controller configured to control the inverter part in relation to driving of the motor, the method including controlling the inverter part such that an input voltage of a specific pattern is applied to the motor in response to a start-up of the driving of the motor, and controlling the driving of the motor on the basis of resistance of a stator of the motor, which is estimated on the basis of a response current corresponding to the input voltage, and a position of a rotor of the motor, which is estimated on the basis of a maximum point of the response current.

Specific details of other example embodiments are included in the detailed descriptions and drawings.

According to an example embodiment of the present disclosure, one or more of the following effects can be achieved.

First, a time for aligning an initial position of a motor can be omitted so that it is possible to drive the motor more rapidly.

Second, a voltage having a low noise is applied to different positions of the motor so that it is possible to reduce noise.

Third, in a case in which a sine wave signal is applied, it is possible to minimize torque ripple.

Effects of the present disclosure will not be limited to the above-mentioned effects and other unmentioned effects will be clearly understood by those skilled in the art from the following claims.

The above description of the present disclosure is only exemplary, and it will be understood by those skilled in the art that various modifications may be made without departing from the scope of the present disclosure and without changing essential features. Therefore, the example embodiments described above should be understood as being illustrative in all aspects instead of limiting. For example, each component described as a single entity may be distributed and implemented, and components described as being distributed may also be implemented in a combined form.

The scope of the present disclosure will be defined by the following claims rather than the above detailed description, and all changes and modifications derived from the meaning and the scope of the claims and equivalents thereof should be understood as being included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor control apparatus comprising:
an inverter configured to convert direct current (DC) power into alternating current (AC) power, and to output the AC power to a motor; and
a controller configured to control the inverter in relation to driving the motor,
wherein the controller is configured to:
control the inverter such that an input voltage having a specific pattern is applied to the motor, in response to a start-up of the driving of the motor, and
control the driving of the motor based on an estimated resistance of a stator of the motor and an estimated position of a rotor of the motor, wherein the estimated resistance is based on a response current corresponding to the input voltage, and the estimated position is based on a maximum point of the response current,
wherein the input voltage having the specific pattern includes a plurality of sub-pattern signals, and an angle of a composite magnetic flux of the motor is sequentially changed according to the sub-pattern signals.

2. The motor control apparatus of claim 1, wherein
a maximum magnitude of the response current is 3 amperes or less, and
a frequency of the response current is 50 hertz or less.

3. The motor control apparatus of claim 1, wherein
when the driving of the motor is to correspond to a first mode, the controller is configured to control the inverter such that the input voltage having the specific pattern is applied to the motor, and when the driving of the motor is to correspond to a second mode, the controller is configured to control the inverter such that the input voltage, having a pattern different from the specific pattern, is applied to the motor.

4. The motor control apparatus of claim 1, wherein the input voltage having the specific pattern includes:
a first section in which a voltage is applied; and
a second section in which a voltage is not applied during a threshold time after the first section such that the response current is to reduce to zero.

5. The motor control apparatus of claim 4, wherein the input voltage having the specific pattern includes at least three second sections.

6. The motor control apparatus of claim 1, wherein average torque according to the input voltage having the specific pattern corresponds to zero.

7. The motor control apparatus of claim 1, wherein the specific pattern is at least one of a square wave, a half wave, a pulse, and a sine wave.

8. The motor control apparatus of claim 1, wherein a number of the sub-pattern signals included in the specific pattern is inversely proportional to a number of the changed angles of the composite magnetic flux.

9. The motor control apparatus of claim 1, wherein the controller is configured to control the driving of the motor based on the angle of the composite magnetic flux corresponding to the sub-pattern signal whose response current according to the input voltage has a greatest magnitude among the plurality of sub-pattern signals.

10. A motor control method of a motor control apparatus that includes an inverter configured to output AC power to a motor, and a controller configured to control the inverter in relation to driving the motor, the motor control method comprising:
controlling the inverter such that an input voltage having a specific pattern is applied to the motor, in response to a start-up of the driving of the motor; and
controlling the driving of the motor based on an estimated resistance of a stator of the motor and an estimated position of a rotor of the motor, wherein the estimated resistance is based on a response current corresponding to the input voltage, and the estimated position is based on a maximum point of the response current,
wherein the input voltage having the specific pattern includes a plurality of sub-pattern signals, and an angle of a composite magnetic flux of the motor is sequentially changed according to the sub-pattern signals.

11. The motor control method of claim 10, wherein
a maximum magnitude of the response current is 3 amperes or less, and
a frequency of the response current is 50 hertz or less.

12. The motor control method of claim 10, wherein
when the driving of the motor is to correspond to a first mode, the controlling of the inverter includes controlling the inverter such that the input voltage having the specific pattern is applied to the motor, and
when the driving of the motor is to correspond to a second mode, the controlling of the inverter includes controlling the inverter such that the input voltage, having a pattern different from the specific pattern, is applied to the motor.

13. The motor control method of claim 10, wherein the input voltage having the specific pattern includes:
a first section in which a voltage is applied; and
a second section in which a voltage is not applied during a threshold time after the first section such that the response current is to reduce to zero.

14. The motor control method of claim 13, wherein the input voltage having the specific pattern includes at least three second sections.

15. The motor control method of claim 10, wherein average torque according to the input voltage having the specific pattern corresponds to zero.

16. The motor control method of claim 11, wherein the specific pattern is at least one of a square wave, a half wave, a pulse, and a sine wave.

17. The motor control method of claim 10, wherein a number of the sub-pattern signals included in the specific pattern is inversely proportional to a number of the changed angles of the composite magnetic flux.

18. The motor control method of claim 10, wherein the controlling of the driving of the motor includes controlling the driving of the motor based on the angle of the composite magnetic flux corresponding to the sub-pattern signal whose response current according to the input voltage has a greatest magnitude among the plurality of sub-pattern signals.

* * * * *